(12) United States Patent
Goring et al.

(10) Patent No.: US 7,707,574 B2
(45) Date of Patent: Apr. 27, 2010

(54) SYSTEM AND METHOD FOR FLEXIBLE APPLICATION HOSTING ON A WIRELESS DEVICE

(75) Inventors: Bryan R. Goring, Milton (CA); Michael Shenfield, Richmond Hill (CA); Viera Bibr, Kilbride (CA)

(73) Assignee: Research in Motion Limited, Waterloo, ON (CA)

( * ) Notice: Subject to any disclaimer, the term of this patent is extended or adjusted under 35 U.S.C. 154(b) by 1288 days.

(21) Appl. No.: 10/787,947

(22) Filed: Feb. 27, 2004

(65) Prior Publication Data

US 2005/0075068 A1   Apr. 7, 2005

Related U.S. Application Data

(60) Provisional application No. 60/508,111, filed on Oct. 2, 2003.

(51) Int. Cl.
G06F 9/46 (2006.01)
G06F 15/16 (2006.01)
G06F 3/00 (2006.01)
G06F 9/44 (2006.01)
G06F 13/00 (2006.01)

(52) U.S. Cl. .................. 718/100; 709/219; 719/331
(58) Field of Classification Search ............ 718/100
See application file for complete search history.

(56) References Cited

U.S. PATENT DOCUMENTS 6,363,436 B1   3/2002   Hagy et al.

FOREIGN PATENT DOCUMENTS

EP   0 811 911 A2   10/1997

OTHER PUBLICATIONS

"PCT Notification of Transmittal of the International Search Report and the Written Opinion of the International Searching Authority, or the Declaration" for the International Patent Application No. PCT/CA2004/00194, Jul. 29, 2005, 15 pages, International Searching Authority.

(Continued)

*Primary Examiner*—Meng-Ai An
*Assistant Examiner*—Eric C Wai
(74) *Attorney, Agent, or Firm*—Gowling Lafleur Henderson LLP; Xiang Lu (57) ABSTRACT

A method of dynamically hosting an application program on a wireless device, a content of the application partitioned into a plurality of module envelopes, each of the module envelopes having a portion of the modules comprising the application, the method comprising the steps of initializing the loading of the application comprising referencing an application information structure, the structure comprising relational information of the module envelopes, selecting one of the module envelopes from the plurality of the module envelopes according to the relational information, configuring a state of the selected module envelope according to a predefined envelope state, the envelope state being selected from a set of envelope states comprising at least two states selected from the group comprising an offline state, an executable state, and a raw state for conversion to the executable state, and providing the selected module envelope, when configured in the executable state, to an application manager for changing the configuration of the application on the device according to the configured module envelope.

37 Claims, 9 Drawing Sheets

OTHER PUBLICATIONS

"PCT Notification of Transmittal of the International Preliminary Examination Report" for PCT International Application No. PCT/CA 2004/000194 filed on Dec. 13, 2004, Dec. 13, 2005, 10 pages, International Preliminary Examining Authority.

Communication Pursuant to Article 96(2) EPC for European application No. 04710757.8, Apr. 11, 2007, 3 pages, European Patent Office.

Gu et al: "Adaptive Offloading Inference for Delivering Applications in Pervasive Computing Environments" Proceedings of the First IEEE International Conference on Pervasive Computing and Communications, Online! Mar. 23-Mar. 26, 2003 pp. 1-8, XP002334270 Retrived from the Internet: URL:http://ieeexplore.ieee.org/ie15/8487/26747/01192732.pdf?tp+&arnumber=1192732 &isnumber=26747>'retrieved on Jul. 1, 2005! abstract; figure 1 p. 2.

Shaylor N: "A Just-In-Time Comiler for Memory Constrained Low-Power Devices" USENIX Java Virtual Machine Research and Technology Syposium, Aug. 1, 2002, pp. 119-126, XP009040876 abstract p. 119, left-hand column, line 16-line 18 p. 119, right-hand column, line 8, p. 120, left-hand column, line 3-line 5.

Translated Chinese Office Action, dated Aug. 17, 2007.

Partial Dependency Tree

SYSTEM AND METHOD FOR FLEXIBLE APPLICATION HOSTING ON A WIRELESS DEVICE

This application claims the benefits of earlier filed provisional application No. 60/508,111, filed Oct. 2, 2003, which is herein incorporated by reference.

BACKGROUND

The present application relates to application hosting on a resource limited device.

There is a continually increasing number of mobile devices in use today, such as mobile telephones, PDAs with wireless communication capabilities and two-way pagers. Software applications which run on these devices increase their utility. For example, a mobile phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing and maintaining the software applications remains a difficult and time-consuming task.

Applications are generally represented in different forms as suits the environment in which they are evaluated. For example, a human may evaluate an application more readily when it contains symbols and descriptive content that are familiar to the reader. This description of an application can be small in size due to the language of expression. One disadvantage is that the processor of a device executing the application cannot recognize human readable form and therefore produces a complied machine readable format. The processor typically evaluates an application in a native format. In order to permit evaluation by a machine the original application content must be subjected to a conversion process. During this process the representation of the application content can grow in size. In this state the content requires additional overhead in terms of storage space, but provides the better performance for execution.

Systems and methods are provided for flexible application hosting to obviate or mitigate at least some of the above presented disadvantages.

SUMMARY

Applications are generally represented in different forms as suits the environment in which they are evaluated. For example, a human may evaluate an application more readily when it contains symbols and descriptive content that are familiar to the reader. This description of an application can be small in size due to the language of expression. One disadvantage is that the processor of a device executing the application cannot recognize human readable form and therefore produces a complied machine readable format. The processor typically evaluates an application in a native format. In order to permit evaluation by a machine the original application content must be subjected to a conversion process. During this process the representation of the application content can grow in size. In this state the content requires additional overhead in terms of storage space, but provides the better performance for execution. Contrary to current hosting modes for applications there are provided systems and methods of dynamically hosting an application program on a wireless device. The application content is partitioned into a plurality of module envelopes, each of the module envelopes having a portion of the modules comprising the application. One such method comprises initializing the loading of the application including referencing an application information structure, such that the structure comprises relational information of the module envelopes. This method further selects one of the module envelopes from the plurality of the module envelopes according to the relational information. This method also configures a state of the selected module envelope according to a predefined envelope state, the envelope state being selected from a set of envelope states including at least two of a raw state, an offline state, and an executable state. Finally, this method also provides the configured module envelope to an application manager for changing the configuration of the application on the device according to the configured module envelope.

A method of dynamically hosting an application program on a wireless device is disclosed, the application content partitioned into a plurality of module envelopes, each of the module envelopes having a portion of the modules comprising the application, the method comprising the steps of: initializing the loading of the application including referencing an application information structure, the structure comprising relational information of the module envelopes; selecting one of the module envelopes from the plurality of the module envelopes according to the relational information; configuring a state of the selected module envelope according to a predefined envelope state, the envelope state being selected from a set of envelope states that includes a raw state, an offline state, and/or an executable state; and providing the configured module envelope to an application manager for changing the configuration of the application on the device according to the configured module envelope.

A wireless device is also disclosed for dynamically hosting an application program, the application content partitioned into a plurality of module envelopes, each of the module envelopes having a portion of the modules comprising the application, the device comprising: a framework for the loading the application including referencing an application information structure, the structure comprising relational information of the module envelopes; a module manager of the framework for selecting one of the module envelopes from the plurality of the module envelopes according to the relational information; a configuration module for configuring a state of the selected module envelope according to a predefined envelope state, the envelope state being selected from a set of envelope states that includes a raw state, an offline state, and/or an executable state; and an application manager of the framework for changing the configuration of the application on the device according to the configured module envelope.

A computer program product for dynamically hosting an application program on a wireless device is further disclosed, the application content partitioned into a plurality of module envelopes, each of the module envelopes having a portion of the modules comprising the application, the computer program product comprising: a computer readable medium; a framework module stored on the computer readable medium for the loading the application including referencing an application information structure, the structure comprising relational information of the module envelopes; a envelope manager module coupled to the framework module for selecting one of the module envelopes from the plurality of the module envelopes according to the relational information; a configuration module coupled to the framework module for configuring a state of the selected module envelope according to a predefined envelope state, the envelope state being selected from a set of envelope states that includes a raw state, an offline state, and/or an executable state; and an application manager module coupled to the framework module for changing the configuration of the application on the device according to the configured module envelope.

BRIEF DESCRIPTION OF THE DRAWINGS

These and other features will become more apparent in the following detailed description in which reference is made to the appended example drawings, wherein.

DETAILED DESCRIPTION

Network System

Figure 1:
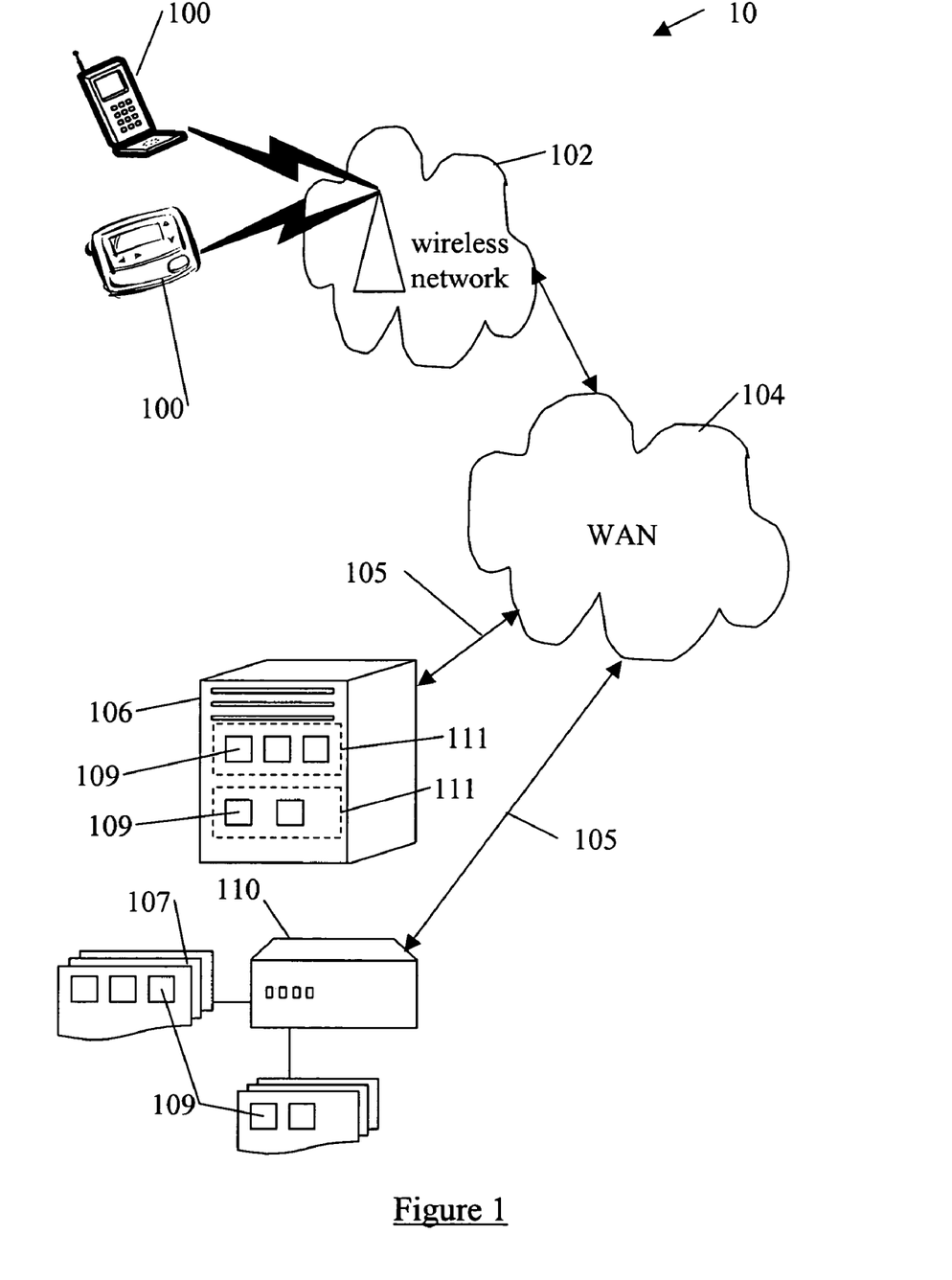
FIG. 1 is a block diagram of a network system.

Referring to FIG. 1, a communication system 10 comprises mobile communication devices 100 for interacting with one or more mobile servers 106 via a coupled wireless network 102 and, in some instances a Wide Area Network (WAN) 104 such as the Internet. The mobile devices 100 transmit and receive requests/response messages 105, respectively, when in communication with the server 106. The mobile devices 100 operate as clients of an application server 110 or other provisioning repository, for example requesting and receiving applications 107 containing a plurality of module envelopes 109, further defined below. It is recognized that the servers 106, 110 could be implemented by a service provider providing a schema-defined service, such as a web service by example, and that the functionality of servers 106 and/or 110 could be combined into a single server or distributed across additional servers (not shown).

The mobile devices 100 can communicate with one or more servers 106 and associated application servers 110 via the wireless network 102 and/or WAN 104. It is also recognized that the mobile devices 100 can be directly coupled to the application servers 110 via a suitable wired or wireless interface (e.g., USB, Bluetooth, etc.). The devices 100 use the mobile server 106 to store or otherwise interact with various selected ones of the module envelopes 109 during execution of the application 107. The mobile server 106 has available a user cache 111 that can be dedicated to the user of the device 100. The server 106 can receive a copy of each envelope 109 of the application 107, once the device 100 has downloaded the application 107 from the application server 110. The mobile server 106 can store the envelopes 109 offline in a raw state, further described below, for subsequent availability to the user upon demand. Accordingly, the device 100 can use the mobile server 106 to store offline some or all of the envelopes 109. It is recognized that the device 100 can dynamically request selected envelopes 109 from the cache 111 in a raw state during execution of the application 107 in the device runtime.

Mobile Device

Figure 2:
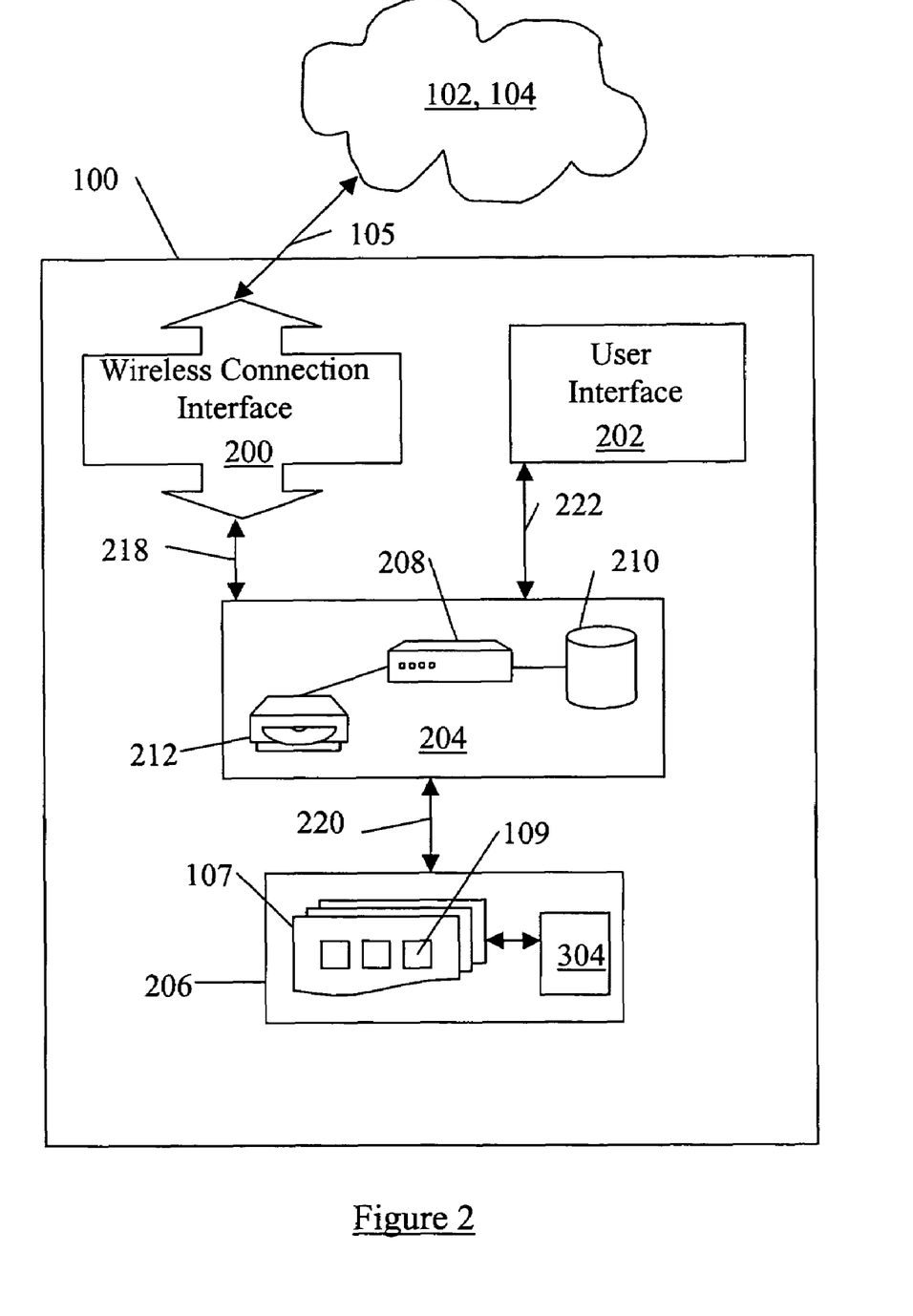
FIG. 2 is a block diagram of a device of FIG. 1.

Referring to FIG. 2, the mobile communication devices 100 are devices such as but not limited to mobile telephones, PDAs, two-way pagers, notebook and/or desktop computers or dual-mode communication devices. The mobile devices 100 include a wireless transceiver 200 coupled via connection 218 to a device infrastructure 204. The wireless transceiver 200 is connectable during operation of the mobile devices 100 to the wireless network 102 by wireless links (e.g., IR, RF, etc.), which enable the mobile devices 100 to communicate with each other and/or with external systems (such as the server 106) via the wireless network 102, and to coordinate the request/response messages 105 between the device 100 and the servers 106. The wireless network 102 may also support voice communication for telephone calls between the mobile communication devices 100 and devices which are external to the wireless network 102. A wireless data transmission protocol can be used by the wireless network 102, such as but not limited to DataTAC, GPRS or CDMA.

Referring again to FIG. 2, the mobile devices 100 also have a user interface 202, coupled to the device infrastructure 204 by connection 222, to interact with a user (not shown). The user interface 202 includes one or more user input devices such as but not limited to a QWERTY keyboard, a keypad, a trackwheel, a stylus, a mouse, a microphone and one or more user output device such as an LCD screen display and/or a speaker. If the screen is touch sensitive, then the display can also be used as the user input device as controlled by the device infrastructure 204. The user interface 202 is employed by the user of the mobile device 100 to coordinate the execution of client application programs 107 in a framework 206, further described below. The user interface 202 also provides an opportunity to customize various state levels of the program 107.

Referring again to FIG. 2, operation of the mobile communication device 100 is enabled by the device infrastructure 204. The device infrastructure 204 includes a computer processor 208 and associated memory module 210. The computer processor 208 manipulates the operation of the wireless transceiver 200, the user interface 202 and the framework 206 of the mobile communication device 100 by executing related instructions, which are provided by an operating system and client application programs 107 located in the memory module 210; the computer processor 208 can include one or more processing elements that may include one or more general purpose processors and/or special purpose processors (e.g., ASICs, FPGAs, DSPs, etc.). Further, it is recognized that the device infrastructure 204 can include a computer readable storage medium 212 coupled to the processor 208 for providing instructions to the processor and/or to load/update client application programs 107 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Processing Framework

Referring to FIG. 2, the framework 206 of the mobile device 100 is coupled to the device infrastructure 204 by the connection 220. The framework 206 provides a native runtime environment for the client application programs 107 and is an interface to the mobile device 100 functionality of the processor 208 and associated operating system of the device infrastructure 204. The framework 206 provides the runtime environment supplying at least the minimum requirements for a controlled, secure and stable environment on the mobile device 100, in which the application programs 107 execute by way of the envelopes 109. It is recognized that the runtime environment can also make the devices 100 clients of any other generic schema-defined services supplied by the service provider. The framework 206 can be considered as software and/or hardware that evaluates the application 107 in its executable state and manages transitions between states of portions of the application 107, i.e. the module envelopes 109. The framework 206 can, in some instances, have available multiple runtime environments for potential use with application 107 and/or module envelopes 109 thereof; the framework could then employ the appropriate runtime for a given application 107, or module envelope 109 thereof.

Further, specific functions of the client runtime environment can include such as but not limited to service 304 support for language, coordinating memory allocation, networking, management of data during I/O operations, coordinating graphics on an output device of the devices 100 and providing access to core object oriented classes and supporting files/libraries. Examples of the runtime environments implemented by the devices 100 can include such as but not limited to Common Language Runtime (CLR) by Microsoft and Java Runtime Environment (JRE) by Sun Microsystems. It should be recognized that the services 304 can be implemented within the runtime environment and/or within the framework 206.

The framework 206 can also provide framework services 304 (a standard set of generic services such as but not limited to Communications, Screen, Data Persistence, Security to the client application programs 107. The application program 107 has communications with the framework services 304. The framework services 304 of the framework 206 coordinate communications via the connection with the device infrastructure 204. Accordingly, access to the device infrastructure 204, user interface 202 and wireless transceiver 200 is provided to the client application programs 107 by the framework 206. It is recognized that a portion of the operating system of the device infrastructure 204 (see FIG. 2) can represent the application runtime environment and/or framework 206. It is recognized that the some or all of the framework services 304 can be provided as an integrated part of each application 107. In addition, or instead, it is recognised that separate common framework service 304 functionality can be shared by a plurality of applications 107.

Referring again to FIG. 3, the processing framework 206 implements the ability to manage the state of the associated modules 109 of the application 107 using a conversion window 318 and a dependency table or other relationship structure 320 (i.e., tree, graph, database entity/table, etc.), further described below. The state management of the envelopes 109 co-ordinates the task of flexible application 107 hosting on the device 100. The Processing Framework 206 can provide generic service framework 304 functionality as part of, or separate from, the application program 107 include functionality such as but not limited to: an Application Manager 306, a Module Dependency Manager 314, a State Compiler 308 or otherwise envelope configuration manager, a Communication Manager 316, an Interpreter Module 312, and a Persistence Manager 310. Other services (not shown) can include a presentation service, an access service, a provisioning service and a utility service.

Figure 3:
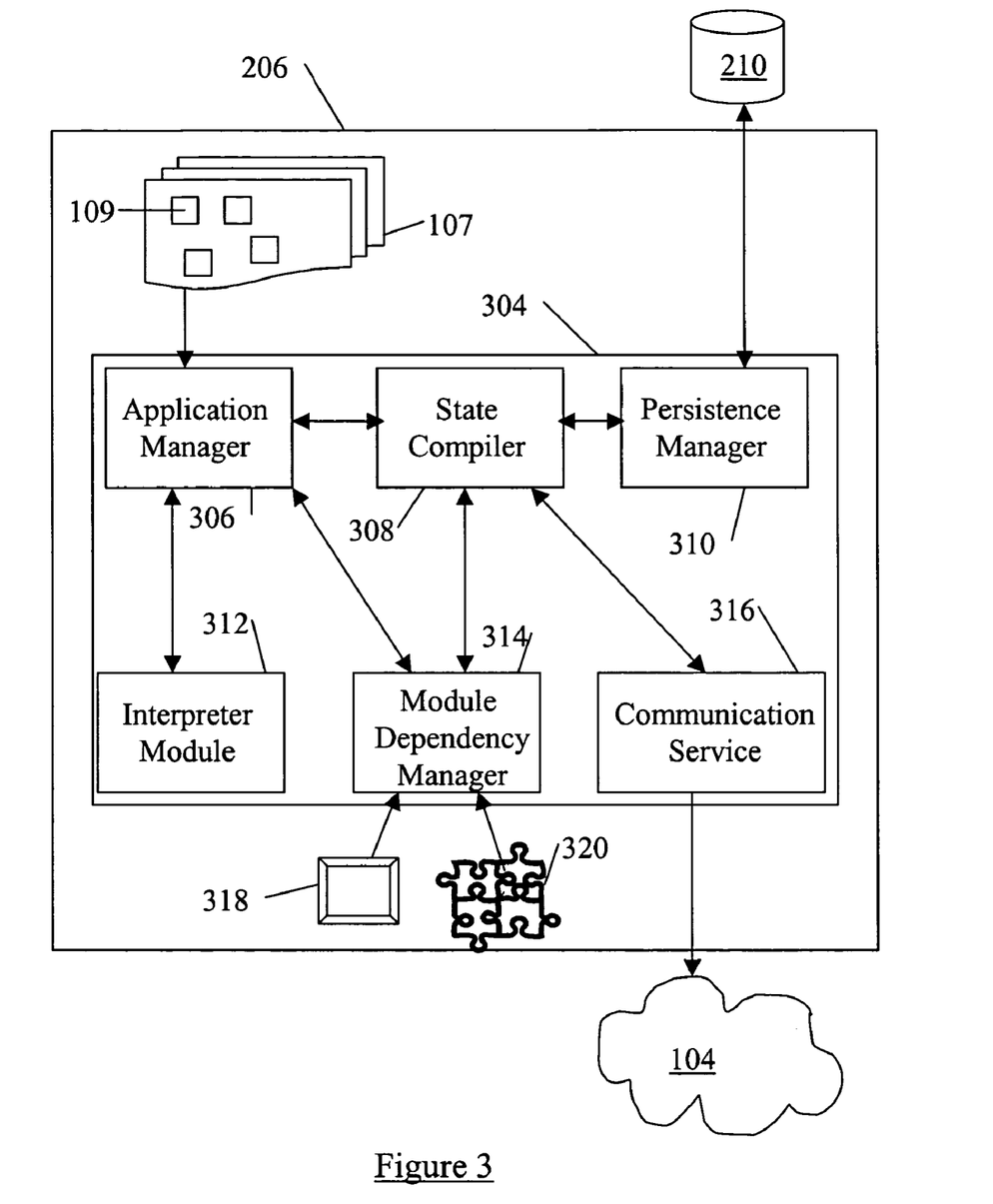
FIG. 3 shows a processing framework of the device of FIG. 2.

The communication manager 316 manages connectivity between the component application programs 107 and the external system 10 via the networks 102 and/or 104, including the ability to request or upload Offlined envelopes 109. The persistence manager 310 stores in the memory module 210 the Module Envelope 109 content locally on the device 100. The Persistence Manager 310 also stores with the application 107 the associated Application Info table 320 including the relationship between the individual modules and module envelopes 109.

The state compiler 308 can manage the provisioning of the software applications 107 on the terminal 100, or direct a separate provisioning service. Application provisioning can include storing the modified state of the envelopes 109. Further, the state compiler 308 transforms the Module Envelope 109 from Raw State into Executable State. This may include compiling executable portions of the Module Envelope 109 such as defined in a scripting or programming language such as ECMAScript, representing descriptive elements as internal meta data, or installing global objects.

The Application Manager 306 can be used to interact with the user interface 202 (see FIG. 2), manages application lifetime etc. The application manager 306 is responsible for evaluating the Module Envelope 109. Executable script portions of Module Envelopes 109 are directed to the Interpreter Module 312. Module Dependency Manager 314 locates a requested Module Envelope 109 from either local or offlined store and co-ordinates preparation of the Envelope 109 for evaluation. The Module Dependency Manager 314 uses the Application Info table 320 that describes which state individual Envelope 109 are in, and may count number of references to particular Envelope 109 to be used in the Offlining process; alternatively, data for other offlining (caching) replacement strategies can be collected. The Interpreter Module 312 can be used to run the content of the Envelopes 109 or to otherwise evaluate executable portions of the Module Envelopes 109. The content of module envelopes can, in some instances include descriptive elements representing, for example, data, presentation and/or messaging content that can be specified in a structured definition language such as XML and/or executable content that can be specified as compiled script/code such as ECMAScript. It is recognized that other configurations of the processing framework 206 and application 107 with respective services 306, 308, 310, 312, 314, 316 for implementing the adaptable application 107 hosting can be other than shown, as desired. In addition, the configuration and partitioning of functionality among modules 304 can be other than shown, as desired; such alternative configurations can include combination of functionality among identified services and/or distribution of functionality to other services (not shown).

Content States

Figure 4:
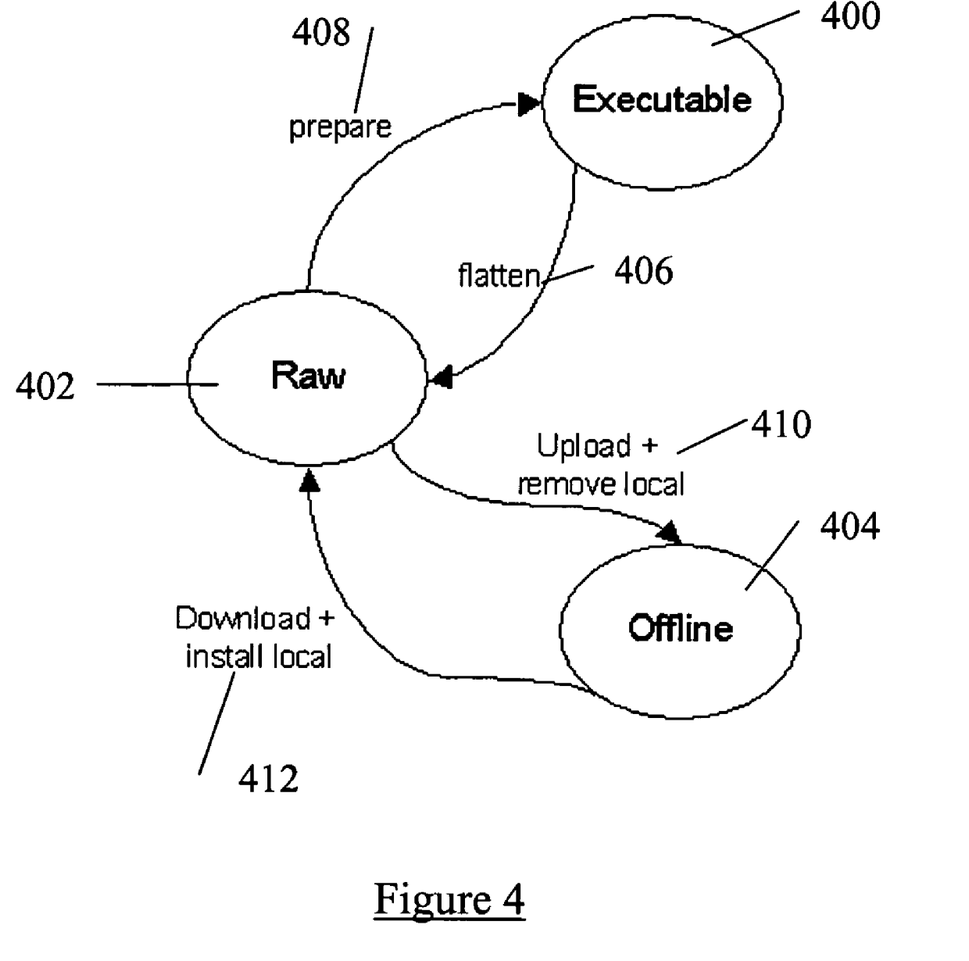
FIG. 4 shows the various states of module envelopes of FIG. 1.

Concerning the states, it is recognized that the application 107 content is composed of Module Envelopes 109 of interest, which comprise code or script (such as but not limited to ECMAScript), and non-executable descriptive elements such as would be represented by the application framework 206, including elements such as, but not limited to, data, presentation, and message entities, which can be expressed in some instances in a structured definition languages (for example XML). The module envelope 109 can be referred to as an atomic parcel of related descriptive and executable content for which state can be maintained. Referring to FIG. 4, the states of the envelopes 109 are such as but not limited to executable 400, raw 402, and offline 404. It is recognized that the states can be applied on a module envelope 109 by envelope 109 basis, wherein each envelope 109 can contain one or more related modules.

Referring again to FIG. 4, the Executable State 400 is the form in which a content of the application 107 is prepared for evaluation or execution by the runtime of the terminal 100, i.e. compiled into a form readable by the runtime. The executable state 400 can have the following characteristics: executable code or script (e.g. ECMAScript) in a compiled form; runtime specific meta data in place to represent descriptive elements; and global objects, when generated.

Referring again to FIG. 4, the Raw State 402 is the form in which content of the application 107 is written, such as the specific language syntax used by a program developer (i.e. human readable). This form can be most convenient for delivery and storage due to its reduced size compared to the Executable State 400. The Raw State 402 is typically not suitable to be evaluated directly by the a Runtime available on the device. In this state additional processing is required for conversion of the application into the Executable State 400. In the Raw State 402, the application 107 has available all required dependencies such as resources (images etc). Additionally, the Raw State 402 of the application 107 can imply co-location (local) with the Device Runtime that evaluates it.

Referring again to FIG. 4, the Offline State 404 is similar to the Raw State 402 in terms of characteristics. The additional feature of the Offline State 404 is that the content is not immediately available by the terminal 100 (i.e. local) for conversion to Executable State 400. In the Offline State 404, the additional step is done of fetching the content from the mobile server 106. The offline state 404 allows infrequently referenced envelopes 109 to be temporarily offloaded to the remote location such as the Mobile Server 106. It is recognized that the offline state 404 could include content in the executable state 400 and/or the raw state 402 but stored remotely. Further, it is recognized that different module envelopes 109 of the application 107 can be placed in any one of the states 400, 402, 404 at any instance thereby providing the application 107 having at least two envelopes 109, each being in a dissimilar state on the device 100. Further, it is recognized that a particular envelope 109 may exist in more than one state and/or location simultaneously, such as both on the device 100 and offline. Accordingly, the parts of the application 107 in the offline state 404 can be represented in Raw state 402, or optionally executable state 404, but are not immediately accessible by the Device Runtime (co-located). Table 1 illustrates the characteristics and potential advantages of each of the three states 400, 402, 404.

TABLE 1

Module Envelope state characteristics

| State | Time to Start | On Device Storage | Availability |
|---|---|---|---|
| Executable | Minimal | Maximum | Always |
| Raw | Includes preparation/ compiling time | Minimum | Always |
| Offline | Includes download and can include preparation/ compiling time | None | Only when connected to the cache 111 or other remote repository |

Application Mixed State

Referring to FIGS. 3 and 4, the notion that individual Module Envelopes 109 may be in any of the above three described states, gives rise to the possibility that the application 107 as a whole is in a mixed state. In this situation there may be Module Envelopes 109 that reside in Raw State 402 for resource savings, Offline State 404 due to inactivity, and/or Executable State 400 for convenience and performance reasons. In a Dynamic Mixed State hosting mode, the Device Runtime can determine what the appropriate state of each Module Envelope 109 should be based on internal decision making regarding the prescribed performance/storage characteristics of the application 107. It is recognized that the hosting mode may be determined as specified by the user of the device 100, the server 106, the device 100 or a combination thereof. Demonstration of dynamic state mixing is illustrated in an intelligent Device Runtime example, as per below. In a Static Mixed State hosting mode, the application 107 may provide a predefined view of the state of individual Module Envelopes 109. This approach may be convenient when the application developer makes decisions about the priority of each envelope 109, which could be referenced from the table 320 and/or window 318. In this model, the Device Runtime would follow the static rules imposed by the application 107 in enforcing the predefined Module Envelope 109 state at runtime.

Referring to FIG. 3, the intelligent Device Runtime of the processing framework 206 operates on application 107 executable and descriptive content on a Module Envelope 109 basis, wherein the applications 107 are partitioned into one or more Module Envelopes 109. Each Module Envelope 109 contains a related parcel of executable and/or descriptive content preferably in the form of respective module(s). In addition, the Module Envelope 109 can specify dependencies to other Module Envelopes 109 comprising the application 109. At any given time the Device Runtime interacts with at least one Module Envelope 109 be represented in the format that is suitable to the runtime for evaluation (i.e. Executable State 400). There is no direct requirement that any other application Module Envelope 109 be in this ready state. In fact, it is advantageous to represent these additional Envelopes 109 in a state that provides the best characteristics vis-à-vis resource limitations (Raw 402 or Offline state 404). Further, the application Module Envelope Dependency table 320 may be used in conjunction with the Conversion Window 318 to allow the intelligent Device Runtime to predict which additional Module Envelopes 109 should be transformed to the executable state 400 as execution of the application 107 progresses according to the device user requirements.

Module Envelope Dependency

The Module Envelope 109 represents the smallest indivisible unit of related executable and descriptive content used in execution of the application 107. The Module Envelopes 109 are linked to module dependency information that allows the Device Runtime to determine what (if any) additional Envelopes 109 in the application 107 are possibly required for evaluation during execution of the user session on the device 100. The module dependency information can be contained explicitly in the respective envelopes 109 or can be placed in a location separate from the envelopes 109. At any given time, only the current Module Envelope 109 is typically placed in the Executable State 400. In order to improve processing efficiency however, it is convenient to use the Conversion Window 318 that specifies the degree to which the Device Runtime is prepared to evaluate these dependencies.

Figure 5:
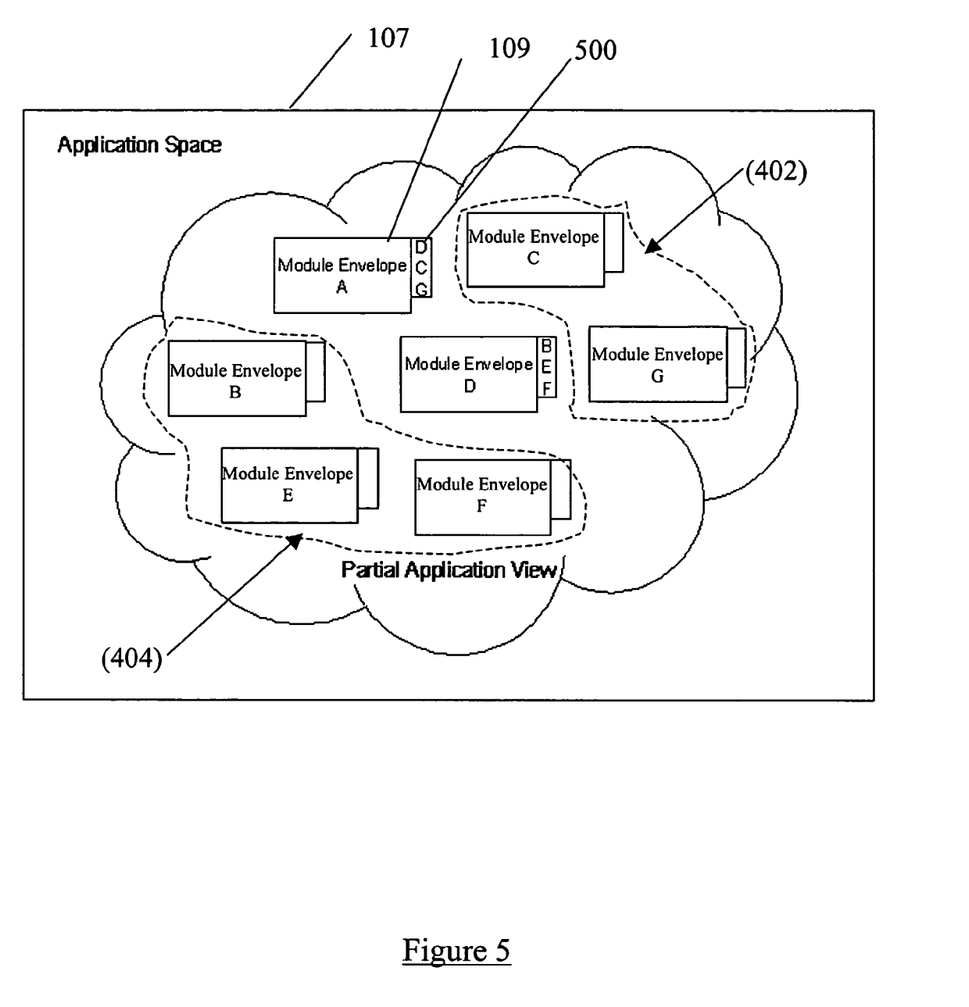
FIG. 5 is a sample application of the system of FIG. 1.

Referring to FIGS. 3 and 5, the Conversion Window 318 is a configurable parameter that determines how many levels of dependencies 500 from a single Module Envelope 109 are transformed to the Executable State 400 by the runtime. This parameter (conversion window) 318 allows the Device Runtime to manage the tradeoffs between the Executable 400 and Raw states 402 (i.e. footprint vs. executable readiness). A partial view of the sample application 107 shows some possible envelopes 109 that comprise the entire application. In the case of Module Envelope A and D, the dependency lists 500 are also illustrated. It should be noted that the modules A and D are considered in the executable state 400, which is dependent upon the execution settings of the application 107 as employed by the configuration of the selected hosting mode. The list 500 represents an expression of additional Module Envelopes 109 on which the described Module Envelope 109 relies for execution.

E and F in the offline state 404, where the envelope A and immediate sub-dependent module D are deemed necessary for execution of the application 107 according to the selected hosting mode. For example, dependency D takes precedence over dependencies C and G during the current execution path of the application 107. Depending upon the size of the conversion window 318 and the parameters of the hosting mode, the application 107 could have all envelopes A, C, D, G in the executable state 400 based on the dependency list 500 of envelope A.

Figure 6:
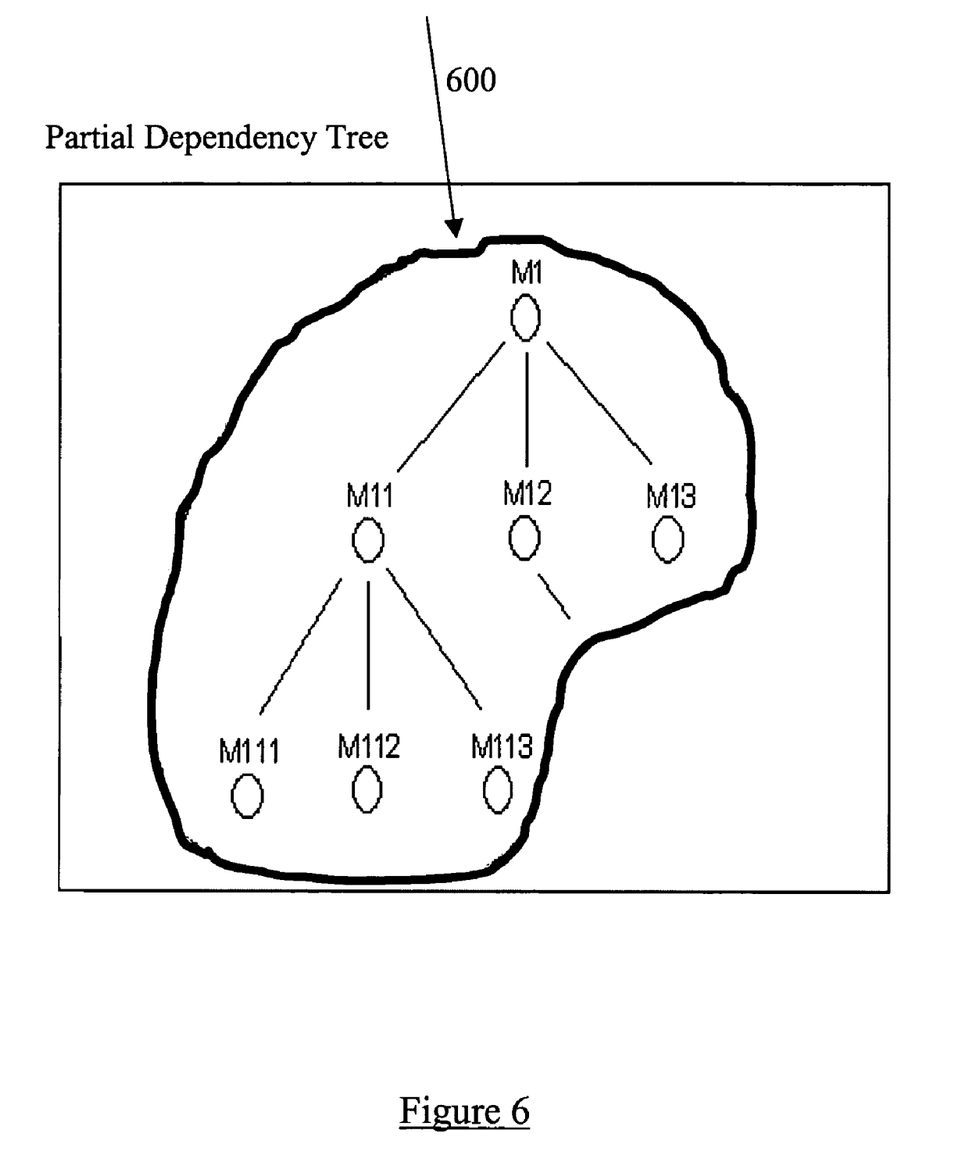
FIG. 6 shows a dependency tree for Module Envelopes of the sample application of FIG. 5.

Referring to FIGS. 3 and 6, the dependency table 320 can include information about a Module Dependency Tree 600 (or Graph). At any given time the inter-module dependencies 500 (see FIG. 5) may be represented by the dependency tree 600. The top node M1 of the tree 600 represents the currently executing Module Envelope 109. This node M1 represents the single absolute requirement for Executable State 400 within the application 107. It is recognized that the device runtime can construct or otherwise modify the dependency tree 600 based on the module envelopes 109 included in the application 107, such as by referencing the dependency lists of respective envelopes 107. Further, the server 106 could also construct or otherwise make available the dependency tree 600 for the applications 107. The mapping between envelope 109 names and node numbers is shown as part of the table 320 given in Table 2, corresponding to the tree 600 of FIG. 6.

TABLE 2

Envelope to dependency node mapping table

| Module Envelope | Node Number |
|---|---|
| A | M1 |
| B | M111 |
| C | M12 |
| D | M11 |
| E | M112 |
| F | M113 |
| G | M13 |

Referring to FIGS. 3 and 6, for example a Predictive State Conversion scheme can be employed by the processing framework 206 using the Conversion Window 318 in conjunction with the Module Envelope Dependency Tree 600. The Device Runtime can pre-stage dependent Module Envelopes 109 for evaluation by waking dependent nodes of the tree to a depth bounded by the Conversion Window 318. This approach can improve performance in module envelope 109 state conversions, and at the same time limit the number of Module Envelopes 109 that are represented in the resource intensive Executable State 400 (see FIG. 4) on the device 100. The predictive scheme could be stated as follows:

1) Module Envelope 109 for the top node (M1) is loaded and prepared for execution. This may be in response to application 107 start-up or a module envelope 109 transition, as further given below. The top node is considered to be at depth 0;
2) Dependencies (see FIG. 5) for the child nodes (M11, M12, M13) are analyzed using the dependency list 500 provided by the current depth Module Envelope 109;
3) Convert all child nodes into the Executable State 400; and
4) Repeat steps 2 and 3 while the depth of executable envelopes 109 is less than or equal to the Conversion Window 318 specified.

The predictive scheme implies, for example, that the Conversion Window 318 of value=0 is reactive, that is only the currently requested Module Envelope 109 is prepared for evaluation. The Conversion Window 318 of value=1 would see modules M1, M11, M12 and M13 prepared for execution, and so on.

State Transitions

Referring to FIG. 4, the three states 400, 402, 404 and the methods by which they transition are illustrated. In the Executable State 400, the respective envelopes 109 of the application 107 may be flattened 406 into its Raw 402 representation. Flattening involves transforming the representation of the application 107 internal to the Device Runtime back into its original downloaded format. It is also recognized that the Raw 402 representation may be retained when forming the executable stat 400, which is subsequently deleted when finished in order to achieve flattening. In the Raw State 402, the envelope 109 may be prepared for evaluation or uploaded. Preparation 408 includes transforming the respective envelopes 109 of the application 107 into the internal representation required by the Device Runtime, i.e. the executable state 400. Uploading 410 involves removing the local copy of the respective envelopes 109 in the Raw 402 state and transmitting them to a remote location (such as the cache 111—see FIG. 1) where storage space is not at a premium. From the Offline State 404, the respective envelopes 109 may be downloaded 412 and installed locally on the device 100. It is recognized that the offline state 404 can include both raw 402 and executable 400 forms of the respective envelopes 109.

The state of the respective envelopes 109 of the application 107 may be manipulated by several actors, namely the user, the server 106, the intelligent Device Runtime of the device 100, or a combination thereof. The user of the device 100 may elect to represent the application 100 as respective envelopes 109 in any of the three states 400, 402, 404 based on user criteria such as but not limited to personal preferences, anticipated usage, etc. In the user driven model, the user can customize/select the hosting mode of the assembly of respective envelopes 109 (i.e. application 107). For example, once the user has downloaded the respective envelopes 109 from the application server 110, the user can configure the hosting mode of selected envelopes 109 from the set of respective envelopes 109 to be optimized for execution efficiency.

In the user driven model, the execution efficiency of the application 107 can be such as but not limited to: all respective envelopes 109 executable in the executable state 400; storage/space efficiency when the device 100 is in coverage (of the network 102) where all respective envelopes 109 are in a combination mixed state of executable 400, raw 402, and offline 404; or storage/space efficiency when the device 100 is not in coverage (of the network 102) where all respective envelopes 109 are in a combination mixed state of executable 400 and raw 402. It is recognized that user can optimize for execution efficiency, storage efficiency, or a combination thereof as a mixed hosting mode. The user can configure the envelope 109 states on a envelope 109 per envelope 109 basis, can opt for similar configuration of envelopes 109 in various envelope 109 groups, or can select predefined hosting configurations of envelopes 109.

In the server driven model, the server 106 may instruct the Device Runtime to manipulate state based on observed metrics such as but not limited to download frequency, messaging activity etc. In the device driven model, the intelligent runtime may determine envelope 109 state based on such as but not limited to frequency of use or a suitable prediction model. It is recognized that the server and device models can select for execution efficiency of the application 107 as described above for the user driven model.

Operation of the System

The system 10 and associated processing framework 206 of the devices 100 (see FIG. 1) allows the application 107 to be divided into separate Module Envelopes 109. The Module Envelope 109 may be represented in one of several states. The Device Runtime manipulates the Envelope 109 state to provide the best compromise between resource limitations and executable readiness. To facilitate this system 10, three application Module Envelope states are employed, such as but not limited to: Executable State 400, Raw State 402, and Offline State 404. Any application Module Envelope 109 that is not immediately required may be maintained in either the Raw State 402 or Offline State 404. In these states, the mode of inactivity is capitalized on to reduce consumption of device 100 resources. The hosting mode of the application 107 can include any desired combination of executable/raw/offline content as selected by the user, the server 106, the device 100 runtime, or a combination thereof.

Application Startup

Figure 7:
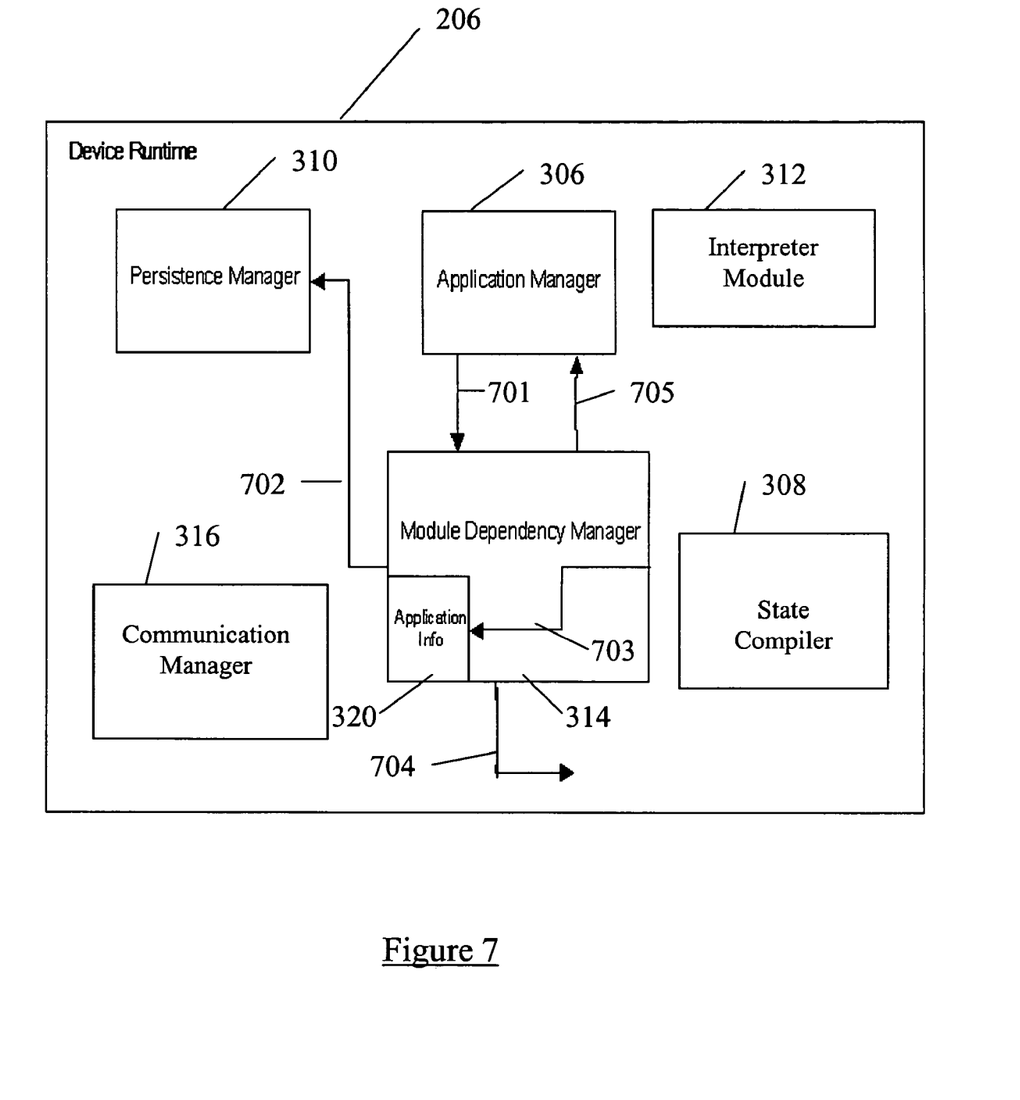
FIG. 7 illustrates an application start-up for the framework of FIG. 3.

On application startup the following steps are conducted (refer to FIGS. 3 and 7).

Figure 8:
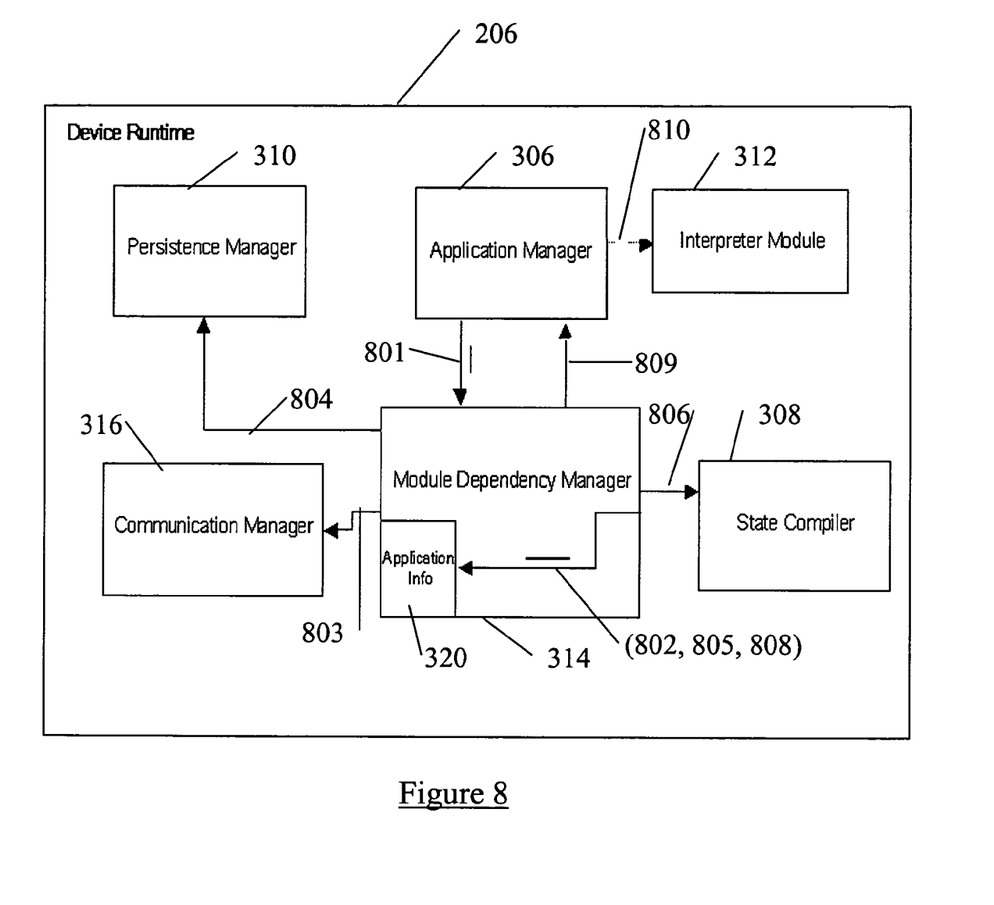
FIG. 8 illustrates Application Module Envelope transition for the framework of FIG. 3.

1) Application Manager 306 requests 701 the Module Dependency Manager 314 to load the application 107.
2) The Module Dependency Manager 314 requests 702 the Application Info table 320 from the Persistence Manager.
3) The Module Dependency Manager 314 determines 703 the application 107 starting point from the Application Info table 320.
4) The Module Dependency Manager 314 loads 704 to request the starting Module Envelope 109 according to the procedure outlined in FIG. 8.
5) The Module Dependency Manager 314 supplies 705 the starting Module Envelope 109 in its Executable State to the Application Manager 306 for evaluation.

Module Transitions

This process kicks off due to a request for a particular Module Envelope 109 from the Application Manager 306. The request may be in response to a Module Envelope dependency 500 or during application startup (described above). Referring to FIGS. 3 and 8 in conjunction with the following passage shows how the Device Runtime behaves to satisfy this dependency.

1) The Application Manager 306 requests 801 the required Module Envelope 109 from the Module Dependency Manager 314.
2) The Module Dependency Manager 314 examines 802 the internal Application Info table 320 to determine what state the required Module Envelope 109 is in. If the Module Envelope 109 is in Raw State 402 steps 803, 804 and 805 are skipped. If the Module Envelope 109 has been pre-staged (converted to executable form) according to step 7, then steps 803, 804, 805 and 806 are skipped.
3) The required Module Envelope 109 is in the Offline State 404. The Module Dependency Manager 314 requests 803 the Communication Manager 316 to download the required Envelope 109.
4) The Module Dependency Manager 314 persists 804 the freshly obtained Module Envelope 109.
5) The Module Dependency Manager 314 updates 805 the Application Info table 320 to indicate that the missing Envelope 109 has been obtained and is now available locally in the Raw State 402.
6) The Module Dependency Manager 314 supplies 806 the Module Envelope 109 to the State Compiler 308. The State Compiler 308 performs operations required to transform the Envelope 109 into the Executable State 400.
7) The Module Dependency Manager 314 now repeats the actions of steps 802-806 for dependent Module Envelopes 109 up to a depth specified by the Conversion Window 318.
8) The Application Info table 320 is updated 808 to reflect the Executable State 400 of the Module Envelope 109.
9) The transformed Module Envelope 109 is returned 809 to the Application Manager 306 for evaluation. The Application Manager 306 evaluates descriptive content, and
10) Transfers 810 execution to the Interpreter Module 312 where required.

Module Offlining

Figure 9:
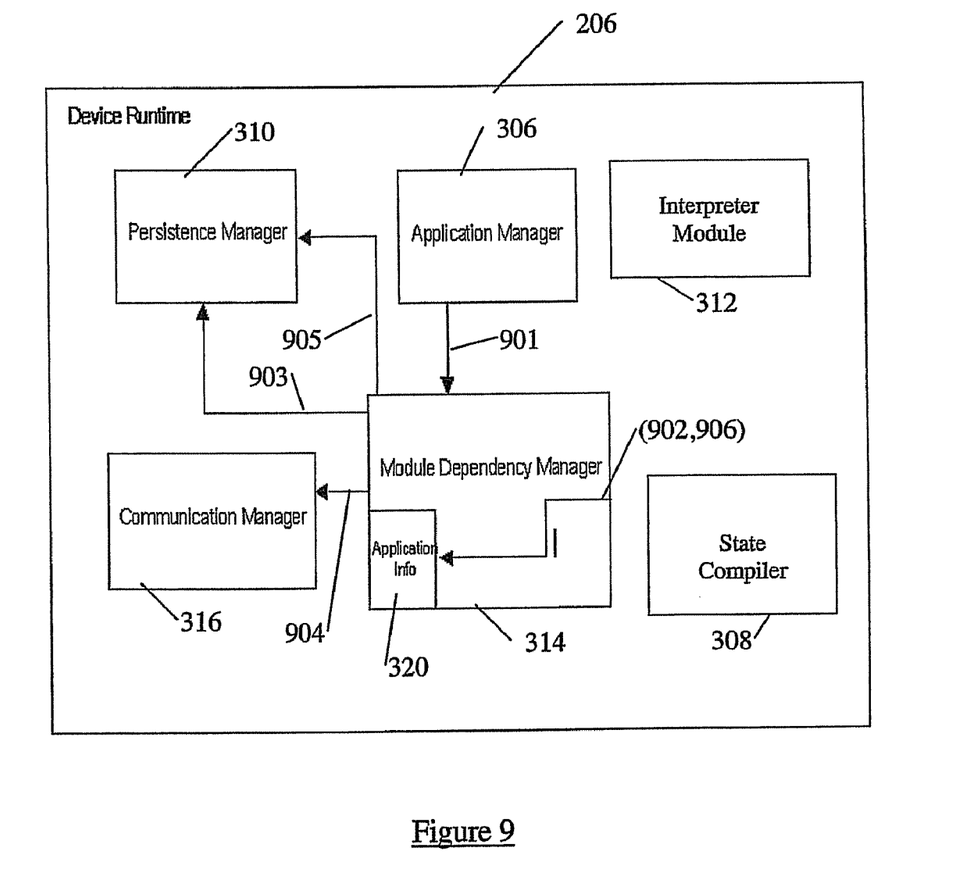
FIG. 9 illustrates Application Offline Module Envelope transition for the framework of FIG. 3.

The process by which the Module Envelope 109 may be offlined by the intelligent Device Runtime is illustrated by the following steps in conjunction with FIGS. 3 and 9.

1) The Application Manager 306 directs 901 processing to the Module Dependency Manager 314 during some idle period
2) The Module Dependency Manager 314 examines 902 the Application Info table 320 of the currently running application 107 and determines which Module Envelopes 109 are infrequently referenced.
3) The Module Envelope 109 is loaded 903 by the Persistence Manager 310.
4) The Communication Manager 316 transmits 904 the Raw Module Envelope 109 to some offline storage area.
5) The Module Dependency Manager 314 removes 905 the local representation from persistent store 210.
6) The Module Dependency Manager 314 updates 906 the Application Info table 320 to indicate that the selected Module Envelope 109 is now in the Offline State 404.
7) Steps 902-906 are repeated as necessary for other envelopes 109.

In view of the above it is recognised that the table 320 (see FIG. 3) can contain a variety of information about the execution path history and projected execution path including such as but not limited to envelope 109 dependencies to one another, current state 400, 402, 404, and location either remote or local.

Accordingly, the Device Runtime may represent a chosen subset of the application 107 or applications 107 in the mixed state form. The Module Envelopes 109 that are in the Raw 400

State or Offline 404 State may be upgraded seamlessly without the user having to perform complex upgrade tasks. The states of the envelopes 109 are such as but not limited to executable 400, raw 402, and offline 404. It is recognized that the states can be applied on a module envelope 109 by envelope 109 basis, wherein each envelope 109 can contain one or more related modules. The processing framework 206 implements the ability to manage the state of the associated modules 109 of the application 107 using the conversion window 318 and the dependency table or other relationship structure 320 (i.e., tree, graph, etc.). The state management of the envelopes 109 co-ordinates the task of flexible application 107 hosting on the device 100.

The above description relates to one or more example systems and/or methods. Many variations will be apparent to those knowledgeable in the field, and such variations are within the scope of the application. For example, it is recognised that implementation of the system can include a framework module for the loading the application 107 including referencing an application information structure 320, the structure comprising relational information of the module envelopes 109; an envelope manager module for selecting one of the module envelopes 109 according to the relational information; a configuration module for configuring a state of the selected module envelope 109 according to a predefined envelope state 400, 402, 404; and an application manager module for changing the configuration of the application 107 on the device 100 according to the configured module envelope 109. These modules can be made available on the device 100 as software, hardware, or a combination thereof.

The embodiments of the invention in which an exclusive property or privilege is claimed are defined as the follows:

1. A method of dynamically hosting an application program on a wireless device, the method comprising:
   initializing loading of an application into the wireless device, the application comprising a plurality of module envelopes, each of the plurality of module envelopes representing an indivisible unit used in execution of the application;
   referencing an application information table, the application information table comprising relational information comprising a state of each of the plurality of module envelopes and dependency information between each of the plurality of module envelopes, the state selected from the group consisting of an offline state, an executable state, and a raw state, wherein the offline state represents a module envelope as located in storage remote from the wireless device, wherein the raw state is for conversion to the executable state, linked to the dependency information, and in a form having a reduced size compared to the executable state;
   selecting a module envelope from the plurality of the module envelopes according to the relational information;
   configuring an envelope state of the selected module envelope according to a predefined module envelope state; and
   providing the selected module envelope, to an application manager for changing the configuration of the application on the wireless device.

2. The method according to claim 1 further comprising retrieving the selected module envelope from a remote store or a local store.

3. The method according to claim 1, further comprising employing a user cache on a remote mobile server to store the module envelopes in the offline state, the cache being attributed to the wireless device.

4. The method according to claim 3, wherein the offline state is in a form comprising a raw form corresponding to the raw state or an executable form corresponding to the executable state.

5. The method according to claim 3 further comprising storing the complete application content represented by the plurality of the module envelopes on the mobile server.

6. The method according to claim 2 wherein the raw state represents a format of the application when expressed in the language of the application.

7. The method according to claim 6, wherein the language of the application comprises a programming language or a structured definition language.

8. The method according to claim 7, wherein the structured definition language is based on eXtensible Markup Language "XML".

9. The method according to claim 1, wherein the executive elements comprise script or programming code.

10. The method according to claim 1, wherein the indivisible units includes a descriptive element comprising a data entity, a presentation entity, or a message entity.

11. The method according to claim 1, wherein the executable state represents a form in which the application content is ready for execution by a runtime environment of the wireless device.

12. The method according to claim 1, further comprising configuring the plurality of module envelopes in a mixed state such that at least two of the selected module envelopes are in a dissimilar state.

13. The method according to claim 12, further comprising converting the selected module envelope between a pair of states, the pair of states comprising: the raw state and the executable state, the raw state and the offline state, or the offline state and the executable state.

14. The method according to claim 13, wherein the relational information further comprises: the location of each of the module envelopes.

15. The method according to claim 1, wherein the dependency information is contained in each of the module envelopes.

16. The method according to claim 1, further comprising employing a hosting mode for the application by a runtime environment on the wireless device, the hosting mode comprising: a dynamic mode permitting the runtime environment to configure the state of each of the module envelopes according to a set of criteria; or a static hosting mode using a predefined state of each of the module envelopes for directing the runtime environment.

17. The method according to claim 16, wherein the set of criteria comprises performance criteria or storage criteria.

18. The method according to claim 16 wherein the hosting mode can be determined by an entity comprising: a user of the wireless device, the runtime environment of the wireless device, or a remote server coupled to the wireless device.

19. A wireless device for dynamically hosting an application program, the wireless device comprising:
   a framework for loading an application, the application comprising a plurality of module envelopes, each of the plurality of the module envelopes representing an indivisible unit used in execution of the application;
   the framework referencing an application information table, the application information table comprising relational information comprising a state of each of the plurality of module envelopes, and dependency information between the plurality of module envelopes, the state selected from the group consisting of an offline state, an executable state, and a raw state, wherein the offline state represents a module envelope as located in storage remote from the wireless device, wherein the raw state is for conversion to the executable state, linked to the dependency information, and in a form having a reduced size compared to the executable state;

a module manager of the framework for selecting a module envelope from the plurality of the module envelopes according to the relational information;

a configuration module for configuring an envelope state of the selected module envelope according to a predefined envelope state;

a communication manager for providing the selected module envelope; and an application manager of the framework for changing the configuration of the application on the wireless device according to the configured envelope state of the selected module envelope.

20. The wireless device according to claim 19, wherein the selected module envelope is configured for retrieving from a remote store or a local store.

21. The wireless device according to claim 19 further comprising a user cache on a remote mobile server to store the module envelopes in the offline state, the cache being attributed to the wireless device.

22. The wireless device according to claim 21, wherein the offline state is in a form comprising a raw form corresponding to the raw state or an executable form corresponding to the executable state.

23. The wireless device according to claim 21 wherein the complete application content represented by the plurality of the module envelopes is configured for storing on the mobile server.

24. The wireless device according to claim 20 wherein the raw state represents a format of the application when expressed in the language of the application.

25. The wireless device according to claim 24, wherein the language of the application comprises a programming language or a structured definition language.

26. The wireless device according to claim 25, wherein the structured definition language is based on eXtensible Markup Language "XML".

27. The wireless device according to claim 19, wherein the executive elements comprise script or programming code.

28. The wireless device according to claim 19, wherein the indivisible unit includes a descriptive element comprising a data entity, a presentation entity, or a message entity.

29. The wireless device according to claim 19, wherein the executable state represents the form in which the application content is ready for execution by a runtime environment of the wireless device.

30. The wireless device according to claim 20, wherein the plurality of module envelopes is configured in a mixed state such that at least two of the selected envelopes are in a dissimilar state.

31. The wireless device according to claim 30, wherein the selected module envelope is convertible between a pair of states, the pair of states comprising the raw state and the executable state, the raw state and the offline state, or the offline state and the executable state.

32. The wireless device according to claim 31, wherein the relational information further comprises the location of each of the module envelopes.

33. The wireless device according to claim 19, wherein the dependency information is contained in each of the module envelopes.

34. The wireless device according to claim 19 further comprising a hosting mode for the application by a runtime environment on the wireless device, the hosting mode comprising a dynamic mode permitting the runtime environment to configure the state of each of the module envelopes according to a set of criteria; or a static hosting mode using a predefined state of each of the module envelopes for directing the runtime environment.

35. The wireless device according to claim 34, wherein the set of criteria comprises performance criteria or storage criteria.

36. The wireless device according to claim 34, wherein the hosting mode can be determined by an entity comprising a user of the wireless device; the runtime environment of the wireless device; or a remote server coupled to the wireless device.

37. A computer program product stored on a computer readable medium when executed by a processor for implementing a method for dynamically hosting an application program on a wireless device, the method comprising:

initializing loading of an application into the wireless device, the application comprising a plurality of module envelopes, each of the plurality of module envelopes representing an indivisible unit used in execution of the application;

referencing an application information table, the application information table comprising relational information comprising a state of each of the plurality of module envelopes, and dependency information between the plurality of module envelopes, the state selected from the group consisting of an offline state, an executable state, and a raw state, wherein the offline state represents a module envelope located in storage remote from the wireless device, wherein the raw state is for conversion to the executable state, has the dependency information and in a form having a reduced size compared to the executable state;

selecting a module envelope from the plurality of the module envelopes according to the relational information;

configuring an envelope state of the selected module envelope according to a predefined module envelope state; and providing the selected module envelope, to an application manager for changing the configuration of the application on the wireless device.

* * * * *